July 4, 1933.   J. H. WAGENHORST   1,916,747
VEHICLE WHEEL
Filed Dec. 5, 1927
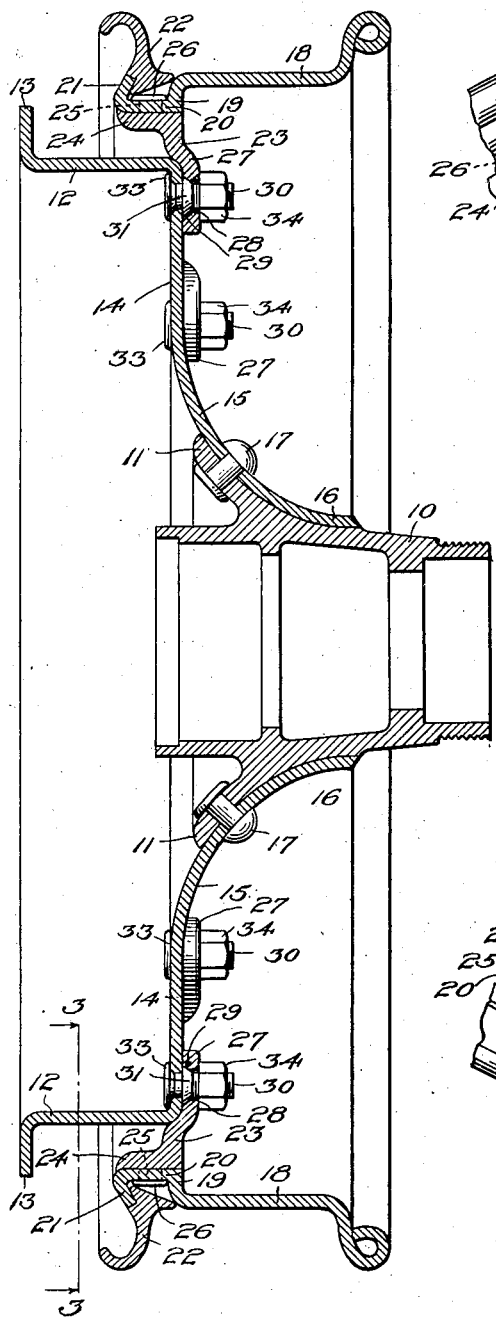
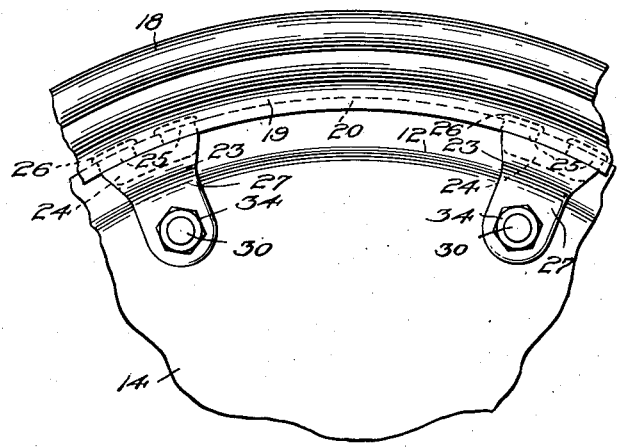
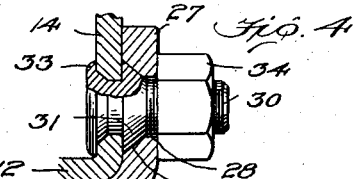
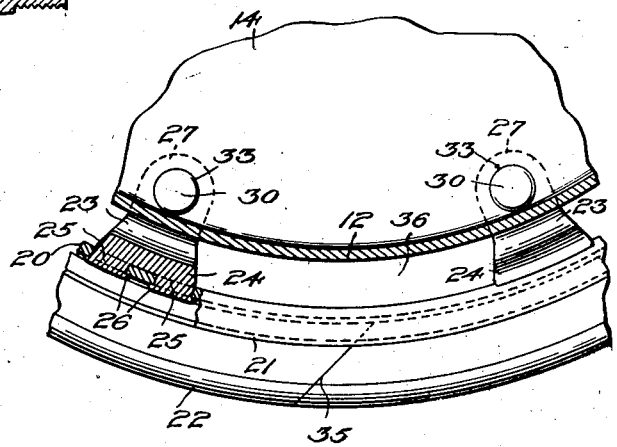
Inventor
James H Wagenhorst
By Church & Church
His Attorneys Patented July 4, 1933

1,916,747

UNITED STATES PATENT OFFICE

JAMES H. WAGENHORST, OF JACKSON, MICHIGAN

VEHICLE WHEEL

Application filed December 5, 1927. Serial No. 237,821.

This invention relates to improvements in vehicle wheels, and has to do, more particularly, with wheels provided with demountable rims. My invention is an improvement upon the construction shown and claimed in U. S. Letters Patent, No. 1,628,626, for vehicle wheels issued to me May 10, 1927.

The chief object of my present invention is to provide an improved and simplified wheel construction for automobiles, in which the unsprung weight of the automobile is largely reduced due to the decrease in the weight of the wheel structure, without any accompanying loss in strength or durability. An object of the present invention is to provide a wheel structure in which a demountable rim, of the type provided with a gutter adapted to receive a detachable side flange, is detachably connected directly to a brake drum mounted on a hub. A further object of my invention is to provide a demountable rim having an improved gutter construction which affords means for attaching securing lugs thereto in a stronger and more satisfactory manner. Another object of my invention is to provide an improved connection between the securing lugs and the brake drum. A further object of my invention is to provide an improved means for attaching a brake drum to the hub of a wheel, which results in a better looking structure and one which can be manufactured cheaply and is strong and durable.

Further objects, and objects relating to details and economies of construction and operation, will definitely appear from the detailed description to follow. In one instance, I have accomplished the objects of my invention by the devices and means set forth in the following specification. My invention is clearly defined and pointed out in the appended claims. A structure constituting a preferred embodiment of my invention is illustrated in the accompanying drawing, forming a part of this specification, in which:

Figure 1 is a vertical, sectional view through a wheel embodying my invention;

Fig. 2 is a fragmentary view, in front elevation, of the wheel shown in Figure 1;

Fig. 3 is a fragmentary, sectional view, taken on the line 3—3 of Fig. 1; and

Fig. 4 is an enlarged, detail, sectional view showing the brake drum, one of the securing bolts and the connections between such bolt and one of the securing lugs.

In the drawing, the same reference numerals refer to the same parts throughout the specification, and the sectional view is taken looking in the direction of the arrows at the ends of the section line.

Referring to the numbered parts of the drawing, in which I have illustrated a wheel structure constituting one embodiment of my invention, I have shown a hub 10 provided with a rearwardly-inclined, annular flange 11, which forms a frusto-conical seating surface on said hub. The brake drum 12 is provided with a rear stiffening flange 13, and the side wall 14 of the brake drum has a central opening, through which the hub 10 is inserted. The central portion of this side wall is forwardly dished so as to provide the portion 16, which fits over the barrel of the hub, and the frusto-conical portion 15, which seats upon the frusto-conical seating surface formed by the hub flange 11. Rivets 17, inserted through the portions 15 of the side wall and through the flange 11, secure the brake drum to the hub.

The demountable, tire-carrying, rim 18 has a portion of the rim base, near its rear edge, bent inwardly, as at 19, then laterally, as at 20, and then outwardly, as at 21, forming a gutter which is adapted to receive a detachable side flange or ring 22, which is transversely split at 35. The portion 20 of the rim base, forming the gutter, is comparatively broad and provides a relatively broad cylindrical surface of less internal diameter than the base of the rim. This relatively broad cylindrical seating surface is engaged by the outer surfaces of a series of securing lugs 23, each of which has a relatively broad outer portion seating against the cylindrical portion 20. Integral riveting studs 25, on said securing lugs, extend through holes in the cylindrical portion 20 of the gutter and are riveted over within the gutter, as at 26, whereby said securing lugs are rigidly attached to the rim in the gutter thereof.

Each securing lug 23 has an inwardly extending portion, which is offset, as at 27, to provide a shoulder seating on the outer periphery of the brake drum. The inwardly extending portion of the securing lug 23 has a bolt hole 28 therein, somewhat larger in diameter than the bolt which is to extend through it, and is provided with a rearwardly facing conical recess 29. A plurality of securing bolts 30 are carried by the side wall of the brake drum, near the periphery thereof, and extend parallel to the axis of the hub. Each of these securing bolts has its front end screw threaded and is provided with a forwardly-facing conical shoulder 31, in the rear of said threaded portion. Each bolt 30 is inserted through a hole in the side wall of the brake drum and has its rear end upset at 33, whereby the shoulder 31 is drawn tightly against the front wall of the brake drum and the bolt is securely fastened in position.

The demountable rim is mounted in position upon the brake drum with the offset portions 27 of the securing lugs seating on the periphery of the brake drum and the conical shoulders 31 on the securing bolts fitting in the conical recesses 29 of the securing lugs. The threaded portions of the securing bolts 30 extend through the bolt holes 28, and nuts 34, screwed on the forward ends of said bolts, engage the securing lugs and maintain the demountable rim seated upon the periphery of the brake drum. Openings 36 are provided between the cylindrical base portion 20 of the gutter and the periphery of the brake drum and these openings permit air to pass around the brake drum to cool it and also allow the dirt and water to clean itself out from between the gutter portion of the demountable rim and the brake drum.

It will be observed that the cylindrical base portion 20 of the gutter provides a relatively broad surface, against which the outer portions of the securing lugs seat, said portions being tightly drawn against this cylindrical base by the riveting over within the gutter of the riveting studs 25. This provides a very strong and satisfactory connection between the securing lugs and the gutter portion of a demountable rim. It will be observed that, in the construction illustrated, load, side-thrust and torque are transmitted from the hub of the wheel to the demountable rim, and vice versa, directly through the brake drum without the interposition of any felly or spoke structure, such as has been customary heretofore. This results in a very great reduction in weight and cost and reduces the unsprung weight of the automobile, without sacrificing strength or durability. It will be observed, also, that the load is transmitted to the brake drum, both by the seating of the offset portions 27 of the lugs upon the periphery of the brake drum, and through the engagement of the conical shoulders 31 on the bolts in the conical recesses 29 provided in the securing lugs. This makes a very satisfactory demountable connection between the rim and the brake drum.

I am aware that the construction illustrated and described herein may be changed considerably without departing from the spirit of my invention and, therefore, I claim my invention broadly, as indicated by the appended claims.

What I claim is:

1. A vehicle wheel comprising a demountable rim having a plurality of short apertured lugs attached to and extending radially inwardly from the inboard edge of the rim base, a hub, a brake drum of substantially the same diameter as the rim base secured to said hub, a plurality of bolts attached to the sidewall of said brakedrum adjacent its periphery and extending through the apertures of said lugs, and nuts threaded upon said bolts and securing said rim to the side wall of said brakedrum.

2. A vehicle wheel comprising a demountable rim having a plurality of short apertured lugs attached to and extending radially inwardly from the inboard edge of the rim base, a hub, a brakedrum secured to said hub, the diameter of said brakedrum being just under the diameter of said rim base so that when said rim and brakedrum are assembled concentrically, the sidewall of the brakedrum itself substantially fills the space outlined by the rim yet is out of direct heat transferring contact with the rim base, a plurality of bolts attached to the sidewall of said brakedrum adjacent its periphery and extending through the apertures of said lugs, and nuts threaded upon said bolts and securing said rim to the sidewall of said brakedrum.

3. A vehicle wheel comprising a demountable rim having its base provided with an annular channel portion extending radially inwardly of the tire-supporting portions proper of the rim, a plurality of short apertured lugs attached to said channel portion and extending radially inwardly from the inboard side of the rim base, a hub, a brakedrum secured to said hub, the diameter of said brakedrum being just under the diameter of the channel portion of said rim base so that when said rim and brakedrum are assembled concentrically, the sidewall of the brakedrum itself substantially fills the space outlined by the rim yet is out of direct heat-transferring contact with the rim base, a plurality of bolts attached to the sidewall of said brakedrum adjacent its periphery and extending through the apertures of said lugs, and nuts threaded upon said bolts and securing said rim to the sidewall of said brakedrum.

4. A vehicle wheel comprising a demountable rim having its base provided with an annular channel portion extending radially inwardly of the tire-supporting portions proper of the rim, a plurality of short apertured lugs extending radially inwardly from the inboard side of the rim base and attached thereto by rivet portions the heads of which are received in the depression of said channel portion of the rim base, a hub, a brakedrum secured to said hub, the diameter of said brakedrum being just under the diameter of the channel portion of said rim base so that when said rim and brakedrum are assembled concentrically, the sidewall of the brakedrum itself substantially fills the space outlined by the rim yet is out of direct heat-transferring contact with the rim base, a plurality of bolts attached to the sidewall of said brakedrum adjacent its periphery and extending through the apertures of said lugs, and nuts threaded upon said bolts and securing said rim to the sidewall of said brakedrum.

JAMES H. WAGENHORST.